United States Patent [19]
Rusu et al.

[11] Patent Number: 6,067,656
[45] Date of Patent: May 23, 2000

[54] METHOD AND APPARATUS FOR DETECTING SOFT ERRORS IN CONTENT ADDRESSABLE MEMORY ARRAYS

[75] Inventors: Stefan Rusu, Sunnyvale; John Wai Cheong Fu, Saratoga; Simon M. Tam, Redwood City, all of Calif.

[73] Assignee: Intel Corporation, Santa Clara, Calif.

[21] Appl. No.: 08/985,536

[22] Filed: Dec. 5, 1997

[51] Int. Cl.[7] .................................................. G06F 11/10
[52] U.S. Cl. ........................... 714/768; 714/758; 714/800
[58] Field of Search ................................... 714/768, 774, 714/758, 800

[56] References Cited

U.S. PATENT DOCUMENTS

| | | | |
|---|---|---|---|
| 3,997,882 | 12/1976 | Goyal | 340/173 |
| 5,428,565 | 6/1995 | Shaw | 365/49 |
| 5,491,703 | 2/1996 | Barnaby et al. | 371/40.1 |
| 5,752,260 | 5/1998 | Liu | 711/129 |
| 5,796,758 | 8/1998 | Levitan | 371/49.1 |

*Primary Examiner*—Emmanuel L. Moise
*Assistant Examiner*—Esaw Abraham
*Attorney, Agent, or Firm*—Blakely, Sokoloff, Taylor & Zafman LLP

[57] ABSTRACT

The invention comprises, in one aspect, a content addressable memory array having a plurality of memory locations to store tag words. The content addressable memory array includes a parity encoder and a parity comparator. The parity encoder has a first input terminal to receive an input data signal and a first output terminal to deliver a signal representative of the parity of the input data signal. The parity comparator has a second input terminal, a third input terminal connected to the first output terminal, and a plurality of memory cells to store original parities of the tag words. The parity comparator compares the original parity of a first tag word to the parity of the input data signal in response to a receiving a match signal. The content addressable memory array includes a fourth input terminal to receive the input data signal, and a second output terminal to send the match signal in response to one of the tag words matching the input data signal. The second output terminal connects to the second input terminal.

28 Claims, 9 Drawing Sheets

TO MORE COMPARISON CELLS

METHOD AND APPARATUS FOR DETECTING SOFT ERRORS IN CONTENT ADDRESSABLE MEMORY ARRAYS

BACKGROUND OF THE INVENTION

1. Field of the Invention

This invention relates generally to computers and memory devices, and, more particularly, to a method and apparatus to detect and correct soft errors in content addressable memory arrays.

2. Description of the Related Art

Figure 1:
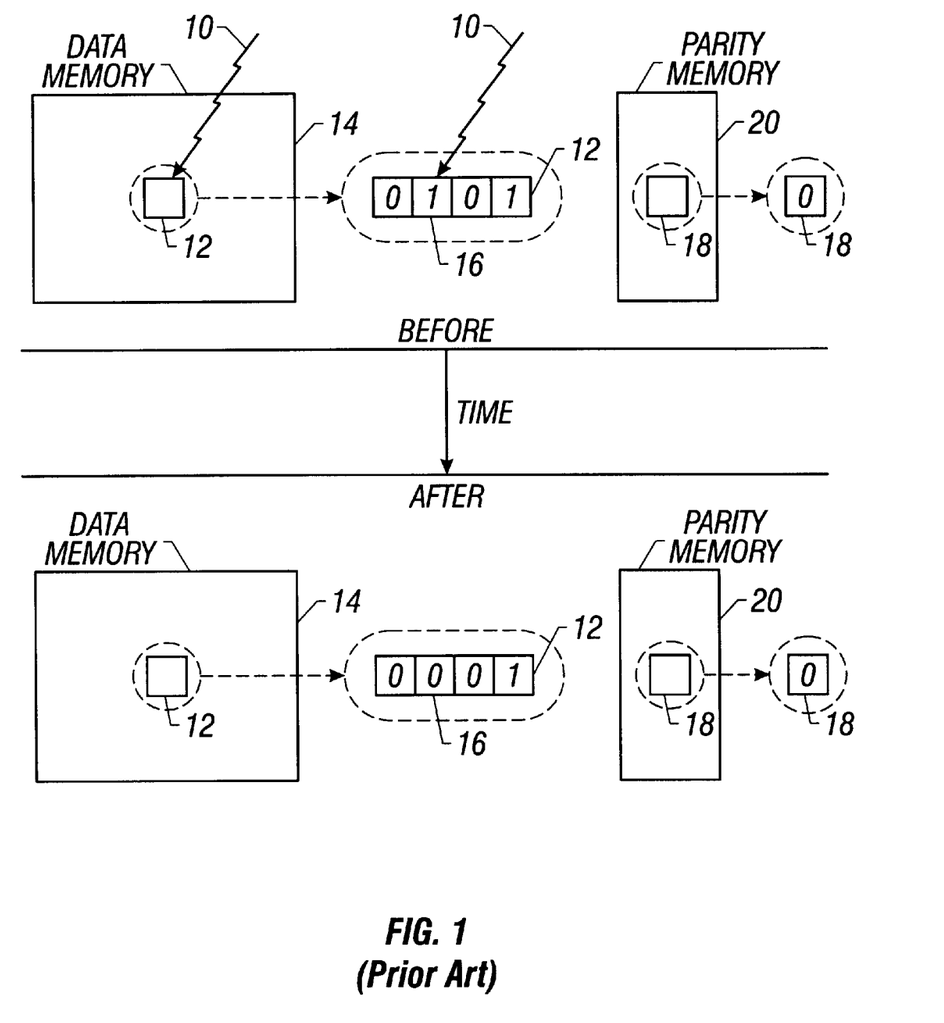
FIG. 1 illustrates the creation of a soft error in a readable data storage array having an associated parity memory storage device.

FIG. 1 illustrates one source of soft errors that occasionally occur during the storage or retrieval of binary information, i.e. impacts of cosmic rays and alpha particles on data storage devices. If a cosmic ray or alpha particle 10 crosses a memory location 12 of a semiconductor data storage device or array 14, the value of a binary bit 16 of data stored therein may be changed. The data storage device 14 of FIG. 1 may be a readable memory such as a random access memory. In the example of FIG. 1, the second bit 16 of the memory location 12 has value of logic 1 before the cosmic ray crosses the memory location 12, and the second bit 16 has the value of logic 0 after the cosmic ray 10 crosses therethrough. Several methods and apparatus have been devised to detect and correct the soft errors that occur while storing and retrieving binary data to and from readable memory devices like the data storage device 14 of FIG. 1. The methods and apparatus generally employ parity bits or error correction codes.

FIG. 1 illustrates how parity may be used to detect soft errors. Some prior art data storage arrays 14 have a parity memory bit 18 associated with each memory location 12 or possibly with each byte in the storage array 14. Each parity memory cell 18 has a value of logic 1 or 0 when the sum of the binary digits of the "original" data word stored in the associated memory location 12 is odd or even, respectively. Thus, the parity is equal to $b_0 \oplus b_1 \oplus b_2 \oplus \ldots \oplus b_{n-1}$ where $b_j$ is the j-th bit of an n-bit memory location and $\oplus$ indicates logical exclusive OR. In the usual case, the parity memory cells 18 associated with the data storage device 14 are collected in a separate bank of readable memory referred to as the parity memory 20.

The parity value of a data word is stored in the parity memory cell 18 at the same time that the data word is originally stored in the associated memory location 12. A cosmic ray or alpha particle ordinarily induces a single error in the data word at the memory location 12 without affecting the parity data stored in the parity memory cell 18. Thus, the parity of the data word at the memory location 12 and the parity stored in the parity memory cell 18 are ordinarily different after a single cosmic ray or alpha particle induces an error. The soft error is detected by comparing the parity of the data word to the original parity stored in the parity memory cell 18.

Figure 2A:
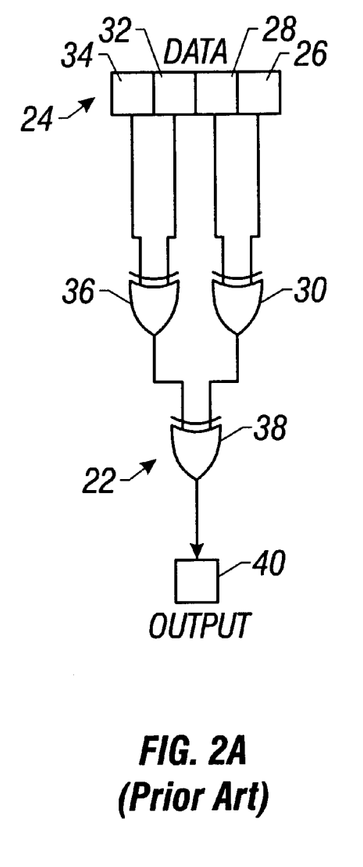
FIG. 2A illustrates a parity encoder for a data signal having four binary digits.

FIG. 2A illustrates a parity encoder 22 for determining the parity of a four bit data word 24. The logic signals from the first two bits 26, 28 of the data word 24 are sent to input terminals of a first, exclusive OR gate 30. The logical signals from the last two bits 32, 34 of the data word 24 are sent to input terminals of a second, exclusive OR gate 36. The output terminals of the first and second exclusive OR gates 30, 36 are connected to a third exclusive OR gate 38. The output terminal 40 of the third exclusive OR gate 38 will deliver a signal representative of the parity of the input data word 24. The parity encoder 22 may be generalized to a device (not shown) that determines the parity of a data word of any length.

Figure 2B:
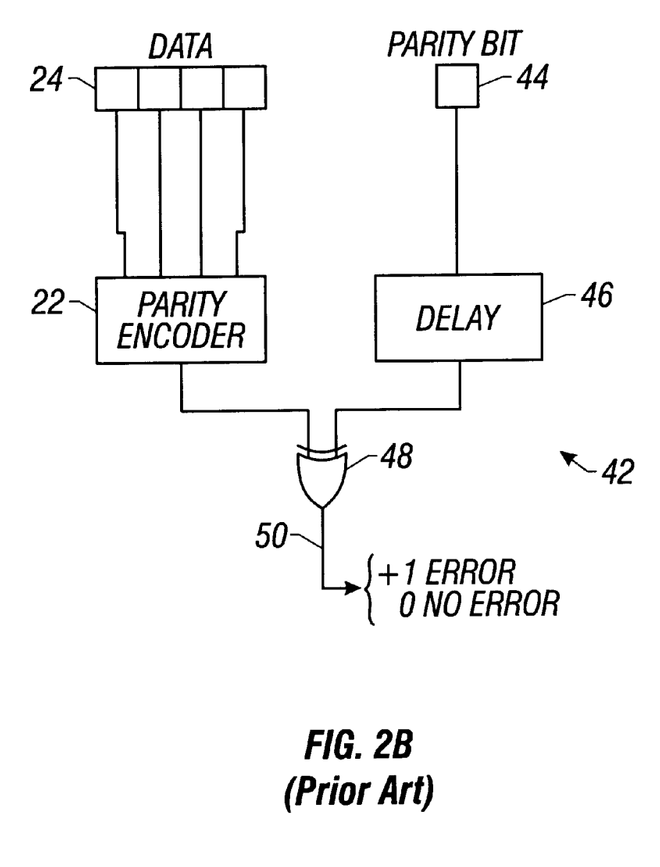
FIG. 2B illustrates a device for detecting soft errors when a memory location is read.

FIG. 2B illustrates a device 42 that employs a parity bit 44 to determine whether a soft one-bit error has occurred in a data word that of the data storage array 14. The parity bit 44 was stored in the parity memory cell at the same time that the original data word (not shown) was stored in the associated data memory location. The device 42 detects soft errors by reading both the data word 24 and the original parity bit 44. The data word is transmitted to the input terminals of the parity encoder 22. The original parity bit 44 may in some cases be stored by a delay element 46 while the parity encoder 22 processes the data word 24. The output terminals of the parity encoder 22 and the delay 46 are connected to the input terminals of an exclusive OR gate 48. The exclusive OR gate 48 acts like a parity comparator determining whether the data word 24 has been changed by a soft error. If the output terminal 50 produces a signal having the value logic 1, a soft error has occurred during either the storage or reading of the data word 24. If the output terminal 50 produces a signal having the value logic 0, the data word 24 does not contain a soft error. The error detector 42 enables the detection of soft errors only when the data word 24 is read.

Similar devices using multiple parity bits and error correction codes (not shown) may be employed to determine which bit of the data word 24 has been changed by the soft error. Nevertheless, the error detection apparatus of the prior art are designed to detect errors when the data words are read. Modern processors have data storage devices or arrays, typically built from static random access memory (SRAM cells), that contain data words which are never read explicitly. The detection of errors in data storage devices that are not read is outside the scope of the prior art device 42 of FIG. 2B.

Figure 3:
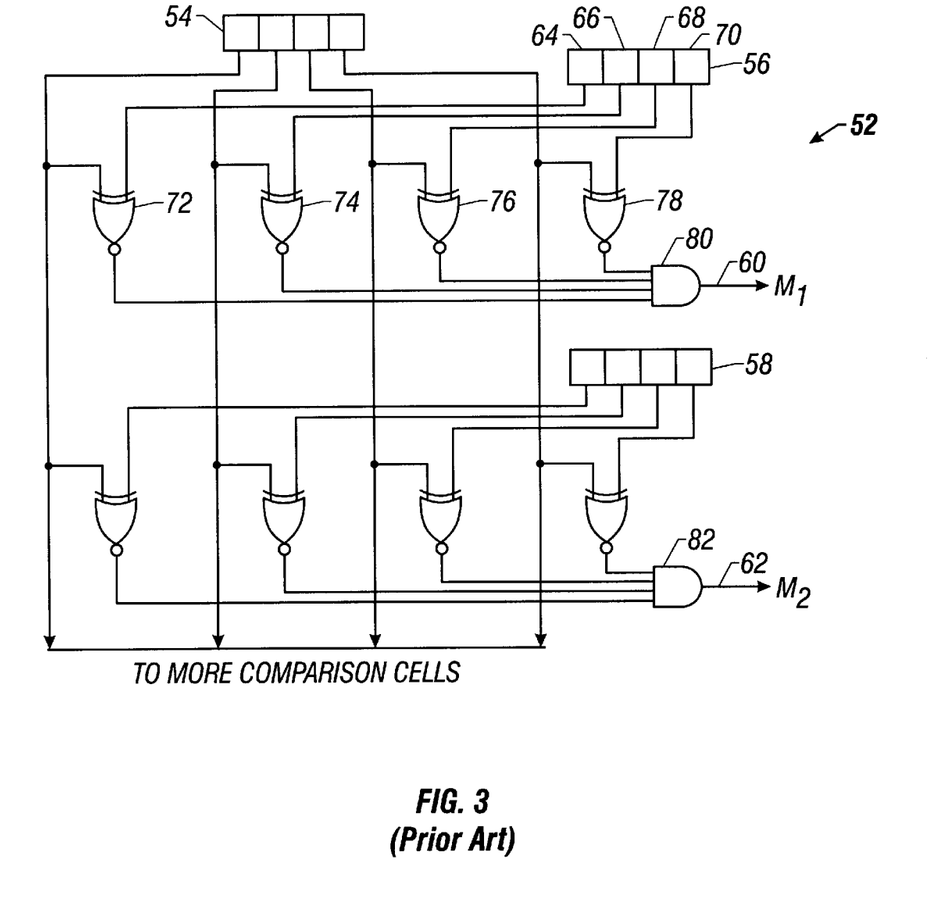
FIG. 3 illustrates the construction and operation of a content addressable memory (CAM) array.

FIG. 3 illustrates a content addressable memory (CAM) array 52. The CAM array 52 is used for comparisons between an input data word 54 and memory words stored in the CAM array 52, such as first and second memory words 56, 58. The CAM array 52 only produces "hit or match" signal on output lines 60, 62. Each bit of the memory words 56, 58, e.g., bits, 64, 66, 68, 70 of the first memory word 56, is connected to a first input terminal of an exclusive NOR gate in a bank of NOR gates, e.g., the bank contains the NOR gates 72, 74, 76, 78 for the first memory word 56 of the CAM array 52. The second input of each exclusive NOR gate, 72, 74, 76, 78 for the first memory word 56 receives an input logic signal from a single digit of the input data word 54. If all of the digits of the input data word 54 match one of the memory words 56 to 58 stored in the CAM array 52, the output line 60, 62 of an associated AND gate 80, 82 produces an output signal having the value of logic 1, indicating a "hit." When no output line, e.g., the output lines 60, 62 and output lines for other memory words (not shown) stored in the CAM array 52, produces a "hit" signal, the output signal of the CAM array 52 is referred to as a "miss" signal.

The memory words 56, 58 stored in the CAM array 52 are never read explicitly. Rather the memory words 56, 58 of the CAM array 52 are only used to produce output "hit or match" signals in response to matches with the input data word 54. Since the data words stored in memory locations 56, 58 are not read, an error detector such as the device 42 of FIG. 2B may not be employed to detect soft errors that have occurred in the CAM array 52. Nevertheless, soft errors may occur in a CAM array 52 due to the same causes for soft errors occurring in the readable data storage device 14 illustrated in FIG. 1, i.e. impacts of cosmic rays, alpha particles, etc.

CAM arrays are used in a variety of capacities in modern computers. For example, CAM arrays are used in look-up tables or directories associated with cache memories. Furthermore, the memory locations of modern CAM arrays have reduced capacitance's and operating voltages. Therefore, modern CAM arrays are more susceptible to the soft errors induced by alpha particles and cosmic rays. Because of the importance of CAM arrays in modern computers and processors, it is important to develop methods and apparatus for the detection of soft errors therein. Errors which are undetected could result in system failure or system data corruption.

The present invention is directed to overcoming, or at least reducing the effects of, one or more of the problems set forth above.

SUMMARY OF THE INVENTION

The invention comprises, in one aspect, a content addressable memory array having a plurality of memory locations to store tag words. The content addressable memory array includes a parity encoder and a parity comparator. The parity encoder has a first input terminal to receive an input data signal and a first output terminal to deliver a signal representative of the parity of the input data signal. The parity comparator has a second input terminal, a third input terminal connected to the first output terminal and a plurality of memory cells to store original parities of the tag words. The parity comparator compares the original parity of a first tag word to the parity of the input data signal in response to a receiving a match signal. The content addressable memory array includes a fourth input terminal to receive the input data signal, and a second output terminal to send the match signal in response to one of the tag words matching the input data signal. The second output terminal connects to the second input terminal.

BRIEF DESCRIPTION OF THE DRAWINGS

Other objects and advantages of the invention will become apparent upon reading the following detailed description and upon reference to the drawings in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The specific embodiments employ devices adapted to compare parities of data signals to original parities of tag words. The parities are equal to the $c_0 b_0 \oplus c_1 b_1 \oplus \ldots \oplus c_{n-1} b_{n-1}$. The $b_j$ are the j-th bit of an n-bit word, the $c_j$'s are weight factors having the values 1 or 0, and $\oplus$ is the symbol for the logical exclusive OR operation. For the ordinary parity, $P_0$, the $c_j$ equal 1 for j=0,1,2 ..., n−1. Other types parity have different weights $c_j$. For example, for an eight bit word, the Hamming error correction code employs four types of parity defined by:

$P_1 = b_1 \oplus b_2 \oplus b_4 \oplus b_5 \oplus b_7$, $P_2 = b_1 \oplus b_3 \oplus b_4 \oplus b_6 \oplus b_7$, $P_3 = b_2 \oplus b_3 \oplus b_4 \oplus b_8$, and $P_4 = b_5 \oplus b_6 \oplus b_7 \oplus b_8$.

The present invention is intended to cover devices using any of the types of parity allowed by the above-mentioned definitions.

Figure 4A:
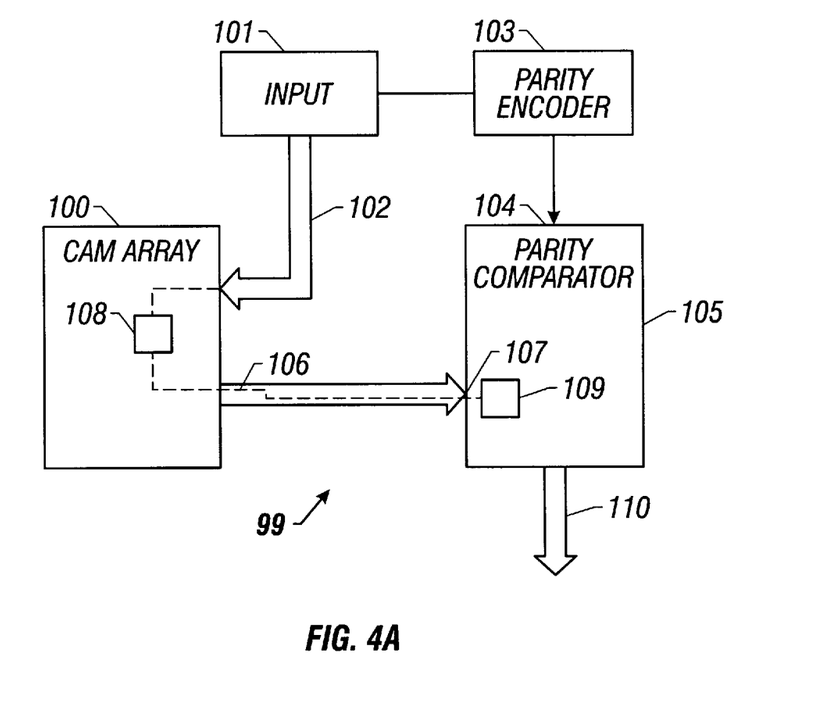
FIG. 4A illustrates a system for detecting soft errors in a CAM array.

FIG. 4A illustrates a system 99 that uses a content addressable memory (CAM) array 100 capable of detecting errors, typically soft errors. An input source 101 for a data signal is coupled, in parallel, to multiple input lines 102 of the CAM array 100 and to a parity encoder 103. The parity encoder 103 is coupled to a first input terminal 104 of a parity comparator 105. The parity encoder 103 produces signals for one or more parity signatures associated with the input data signal. In some embodiments the input source 101 delivers both the data signal and one or more logic signals for the parities of the input signal. In these cases, the parity encoder 103 may direct the received parity information to the first input terminal 104 of the comparator 105. The CAM array 100 determines whether the input data signal matches any tag word stored therein without reading the tag words. Output lines 106 from the tag memory locations of the CAM array 100 are coupled to a second input part 107, e.g., multiple inputs, of the parity comparator 105. The parity comparator 105 has a parity memory cell associated with each tag memory location of the CAM array 100. For example, a tag memory location 108 of the CAM array 100 is associated with a parity memory cell 109 of the parity comparator 105. The parity memory cell 109 is adapted for storing the original parity of the associated tag word stored in the memory location 108 of the CAM array 100. The parity comparator 105 has one or more output lines 110 for signals that indicate hits or misses, i.e. matches both between the input data signal and a particular tag and the original tag and data signal parities.

The CAM array 100 and system 99 may have several uses in a processor. For example, the CAM array 100 may be a directory of a cache memory (not shown). Checking for soft errors verifies that the cache directory is correctly pointing to data entries in a cache data array. While the CAM array 100 is an addressable memory, the parity comparator 105 may incorporate either associative or readable memories. The CAM array 100 is typically a static random access memory (SRAM), but the CAM array 100 may be a "readable" memory in some embodiments. The parity comparator 105 may also employ memories SRAM. In some embodiments, the parity memory cells, e.g., memory location 109 has several parity bits. Several parity bits may be employed in combination with an error correction code, such as the well-known Hamming code, to determine which bits of the tag word stored in the associated tag memory location, such as the memory location 108, contain an error. In these embodiments, soft errors may be corrected by restoring corrected tag words in the memory locations of the CAM array 100 containing soft errors.

Figure 4B:
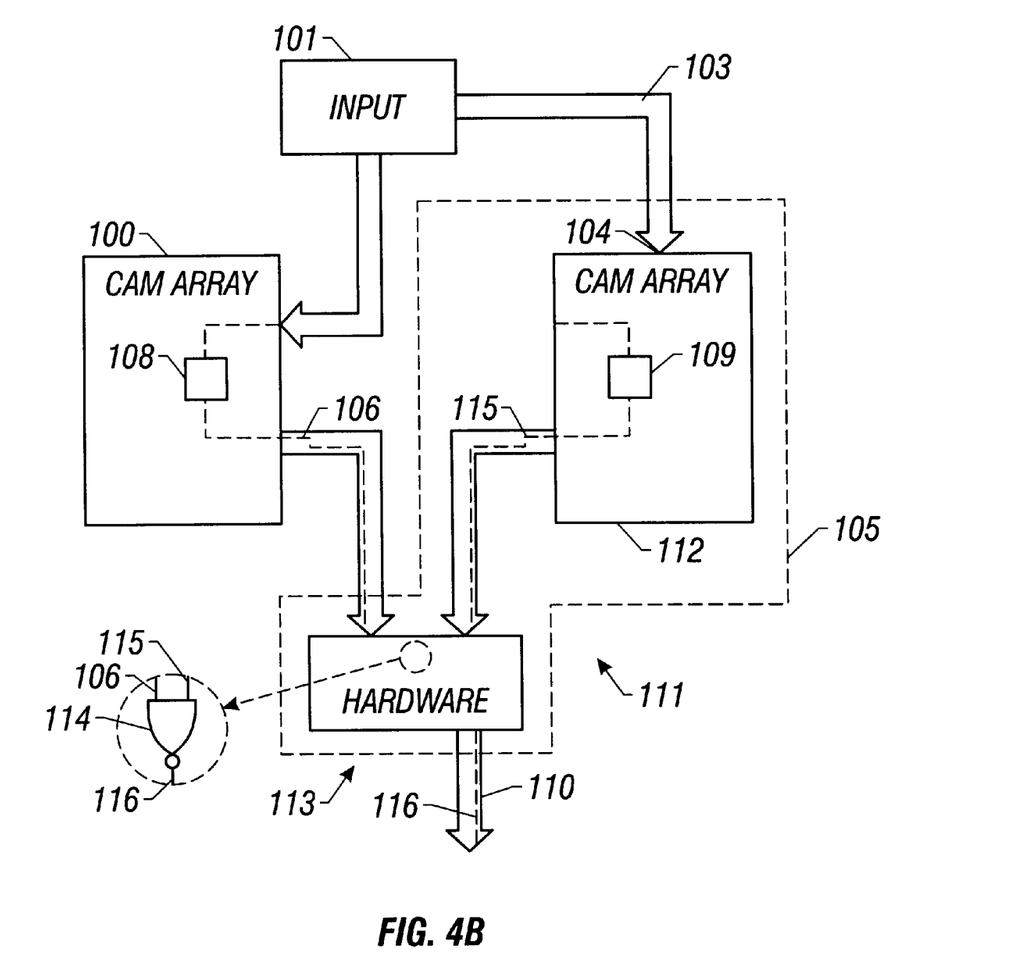
FIG. 4B is an embodiment of the system of FIG. 4A employing a doubled CAM array.

FIG. 4B illustrates a specific embodiment 111 having two identical CAM memories 100, 112 with duplicate memory locations 108, 109. The parity comparator 105 includes the second CAM array 112 and a hardware device 113. The parity encoder 103 is a group of lines connecting the input source 101 to the second CAM array 112. Pairs of outputs from associated memory locations, e.g., the outputs 106, 115 from the associated memory locations 108, 109, connect to associated input terminals of the hardware device 113. In one embodiment, the hardware device 113 is a bank of AND gates. The inputs of each AND gate connect to one associated pair of outputs. For example, the gate 114 has inputs terminals connected to the output lines 106, 115 from the associated memory locations 108, 109 and an output line 116 to report a "hit." The hardware device 113 delivers a "hit" signal to the output lines 110 in response to an input signal matching the associated copies of the tag word in both CAM arrays 100, 112.

Figure 4C:
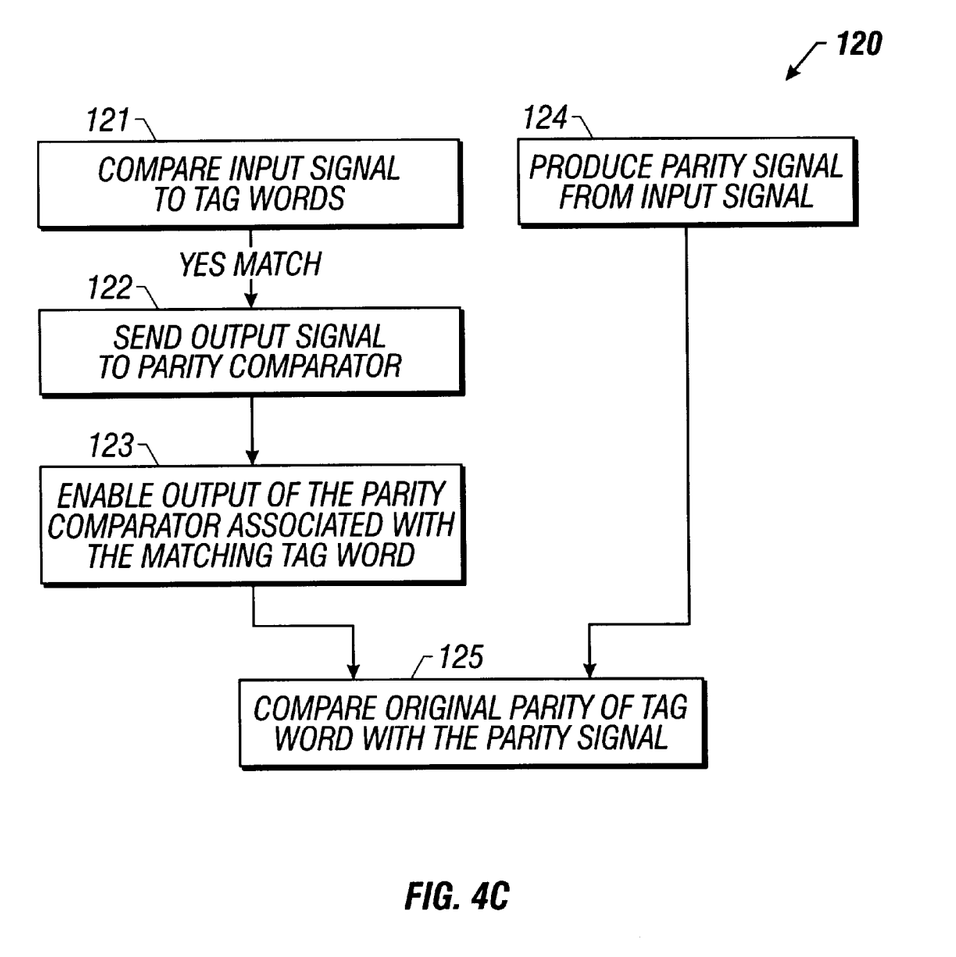
FIG. 4C is a flowchart illustrating the steps of an embodiment for detecting soft errors in a CAM array.

FIG. 4C is a flowchart illustrating the steps of an embodiment 120 to detect errors, typically soft errors, in the CAM array 100 of FIG. 4A. At block 121, an input signal is compared to tag words stored in the CAM 100 array for a match. At block 122, an output signal is sent from the output lines 106 of the CAM array 100 to the input lines 107 of the parity comparator 105 in response to finding a match between the input data signal and a particular tag word stored in the CAM array 100. At block 123, the output signal from the CAM array 100 enables at least one output line from the parity comparator 105. At block 124, the parity encoder 103 produces a parity signal from the input data signal and sends the parity signal to the input terminal 104 of the parity comparator 105. At block 125, the parity comparator 105 compares the original parity of the particular tag word matching the input signal with the parity signal received from the parity encoder 103. In some embodiments, the parity comparator 105 produces a signal for a "hit" on the output lines 110 in response to the original parity and the parity signal matching. In some embodiments the parity comparator 105 produces a signal for a "miss" and/or a signal to invalidate the tag word that matched the input signal on the output lines 110 in response to the original parity and the parity signal not matching.

Figure 4D:
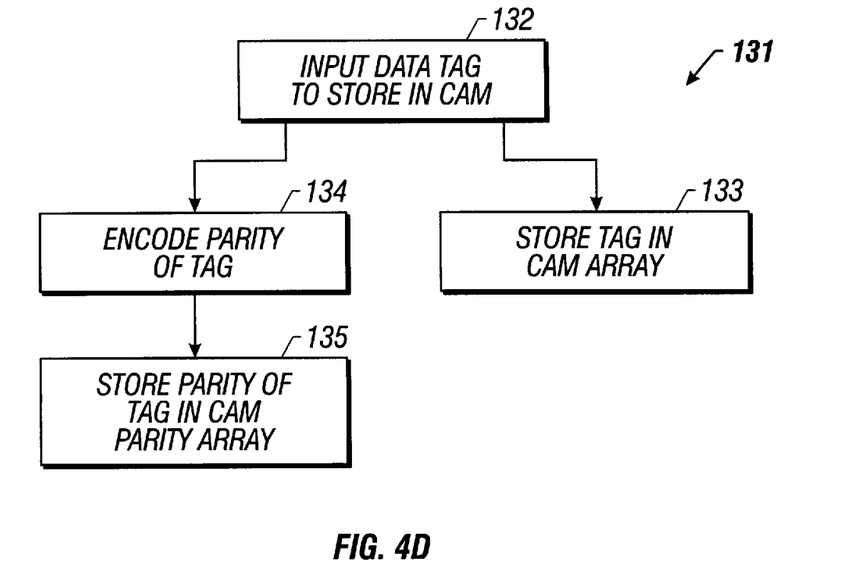
FIG. 4D is a flowchart illustrating the steps of a particular method for storing memory words in the system of FIG. 4A.

FIG. 4D is a flowchart illustrating a method 131 for storing the tag words in the CAM array 100 and for storing the associated original parity data in the parity comparator 105. At block 132, the original signal for the tag word is sent to first storage input terminals (not shown) of the CAM memory array 100 and to an input terminal of a second parity encoder (not shown). The output of the second parity encoder is connected to second storage input terminals (not shown) of the parity comparator 105. At block 133, the signal at the first storage input terminals is stored in a tag memory location of the CAM array 100, such as the memory location 108. At block 134, the second parity encoder produces an output signal for the parity of the original signal for the tag word. At block 135, the output from the second parity encoder is stored in the parity memory cell of the parity comparator 105 associated with the memory location of the CAM array 100 storing the tag word. For example, the parity memory cell 109 is associated with the tag memory location 108. Thus, the parity memory cells of the parity comparator 105 store the parity of the original input data signal that was stored in the associated tag memory location of the CAM array 100.

Figure 5A:
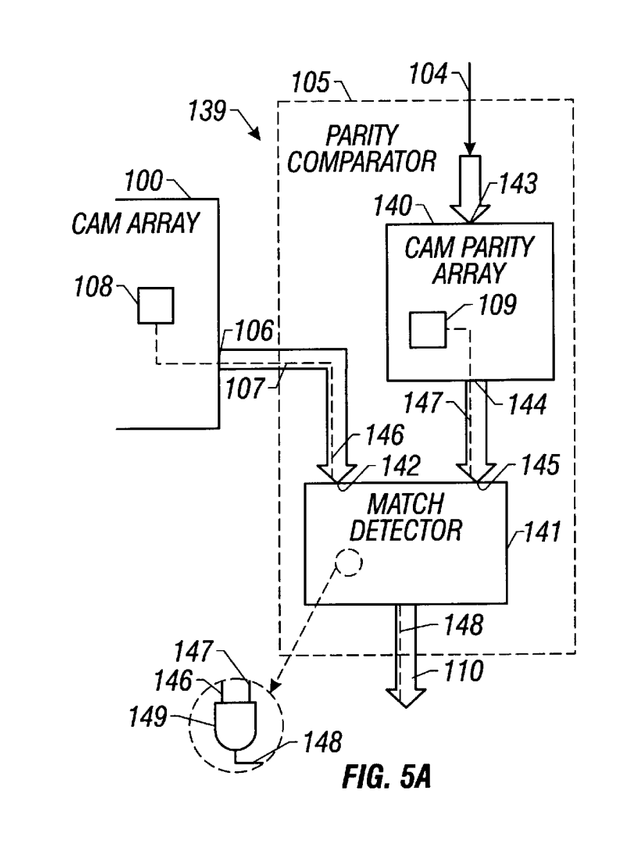
FIG. 5A illustrates a first specific embodiment for the parity comparator of the system of FIG. 4A.

FIG. 5A illustrates a specific embodiment 139 of the parity comparator 105 of FIG. 4A. The parity comparator 105 comprises a CAM parity array 140 and a match detector 141. The CAM parity array 140 may employ SRAM's or dynamic random access memories (DRAM's). The multiple input lines 107 of the parity comparator 105 are connected to multiple first input lines 142 of the match detector 141. Multiple input lines 143 of the CAM parity array 140 are connected in parallel to the input terminal 104 of the parity comparator 105. For each tag memory location of the CAM array 100, there is one or more associated parity memory cells in the CAM parity array 140. For example, the parity memory cell 109 of the CAM parity array 140 is associated with the tag memory location 108 of the CAM array 100. In some embodiments, each memory location of the CAM array 100 has several associated memory cells of the CAM parity array 140, which may be used by error correction codes. Parallel output lines 144 from the CAM parity array 140 are individually connected to second input lines 145 of the match detector 141. All the input lines 142, 145 into the match detector 141 are paired. For example a first input line 146 is connected to the output of the tag memory location 108, and a second input line 147 is connected to the output of the parity tag memory cell 109 that stores the original parity of the tag word in the associated tag memory location 108. In some embodiments, the match detector 141 may be physically integrated into either the CAM or CAM parity arrays 100, 140.

The match detector 141 has a separate pair of input lines 142, 145 and one output line 110 for each associated tag location and parity memory cell of the CAM and CAM parity arrays 100, 140. For example, the pair of input lines 146, 147 connect to the output terminals of the associated tag location 108 and parity memory cell 109. The pair of input lines 146, 147 also has a corresponding output 148 line. In one embodiment, each associated pair of input lines to the match detector 141 connect to a separate AND gate in the match detector 141, and the associated output line connects to the output terminal of the AND gate. For example, the pair of inputs 146, 147 connect to an AND gate 149 having an output terminal 148. Then, a hit signal (a signal of logic 1 for the AND gate embodiment) on the output line 148 results from matches both between the tag word and input signal and between the original parity of the tag word and the parity of the input signal. In other embodiments, an output line of the match detector 141 sends a "hit" signal whenever two associated input lines report simultaneous matches.

Finally, in some constructions of the CAM and CAM parity memories 100, 140 of FIG. 5A, each memory location has an output line connected to two (or more) output lines 106, 144, for example, corresponding to the x,y-address of the memory locations. Then, "hit" output signals are conveyed along a pair of output lines 106, 145 from both the CAM array 100 and the CAM parity array 140. Thus, the total number of input lines 142, 145 and output lines 110 into and out of the match detector 141 are decreased. A "hit" and no soft error corresponds to a signal of logic 1 on two output lines 110 of the match detector 141 that correspond to an x,y-address in this embodiment. Finally, the CAM array 100 and CAM parity array 140 may be organized like a fully associative memory.

Figure 6A:
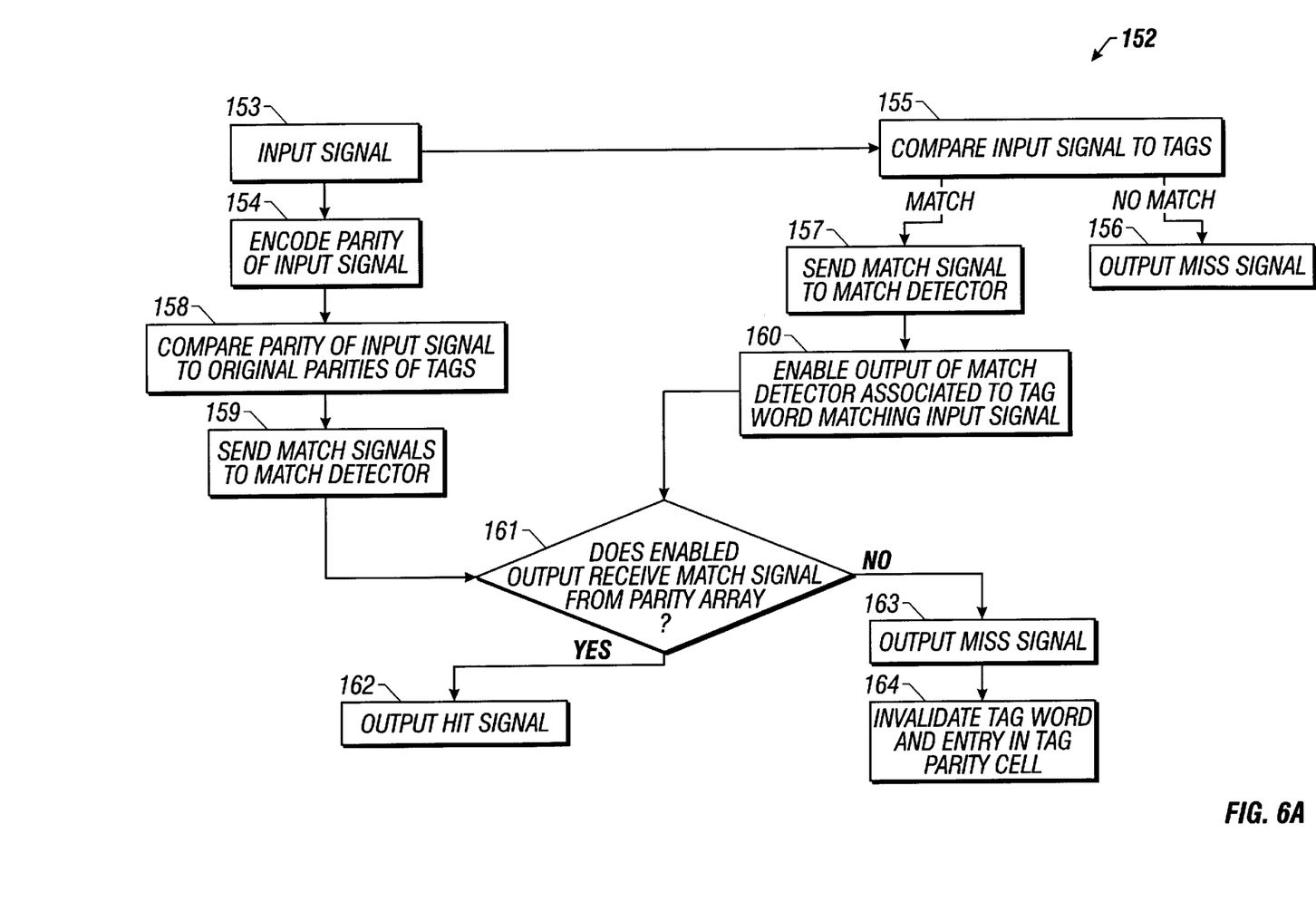
FIG. 6A is a flowchart illustrating the steps of a first specific embodiment for detecting soft errors with the embodiment of FIGS. 4A and 5A.

FIG. 6A is a flowchart illustrating the steps 152 of a method for detecting soft errors with the system 99 of FIG. 4A and the parity comparator 139 of FIG. 5A. At block 153, an input data signal is received at the input data source 101. At block 154, the input signal is sent to the parity encoder 103 to produce a signal for at least one parity signature of the input signal. At block 155, the input signal is sent to the input lines 102 of the CAM array 100 and compared to the tag words stored therein. At block 156, the CAM array 100 delivers a signal over the lines 106 for a "miss" if no tag word stored in the CAM array 100 matches the input signal. At block 157, the CAM array 100 delivers a signal for a match over the lines 106 in response to a first tag word matching the input signal. At block 158, the input signal parity is sent from the parity encoder 103 to the CAM parity array 140 to compare with the original parities of substantially all or all of the tag words for matches. At block 159, signals for matches in the CAM parity array 140 are sent to the match detector 141. At block 160, a first output line 148 of the match detector 113 is enabled in response a match between the first tag word of the first tag memory location 108 and the input signal from the CAM array 100. At block 161, the match detector 141 determines whether the tag parity cell 109 associated with the first tag memory location 108 has reported a match also. At block 162, the match detector 141 reports a "hit" if the tag parity cell 109 associated with the first tag memory location 108 also reports a match. At block 163, the match detector 141 returns an "miss" signal if the parity cell 109 associated with the first tag memory location 148 does not report a match. In some embodiments, the "miss" signal is simply no signal, i.e. logic 0, on all the output lines 110 of the match detector 142. At block 164, some embodiments produce an output signal to invalidate the first tag word in response first tag parity cell 109 not reporting a match. Then, a new tag word may be subsequently stored in the first tag memory location 108.

Figure 5B:
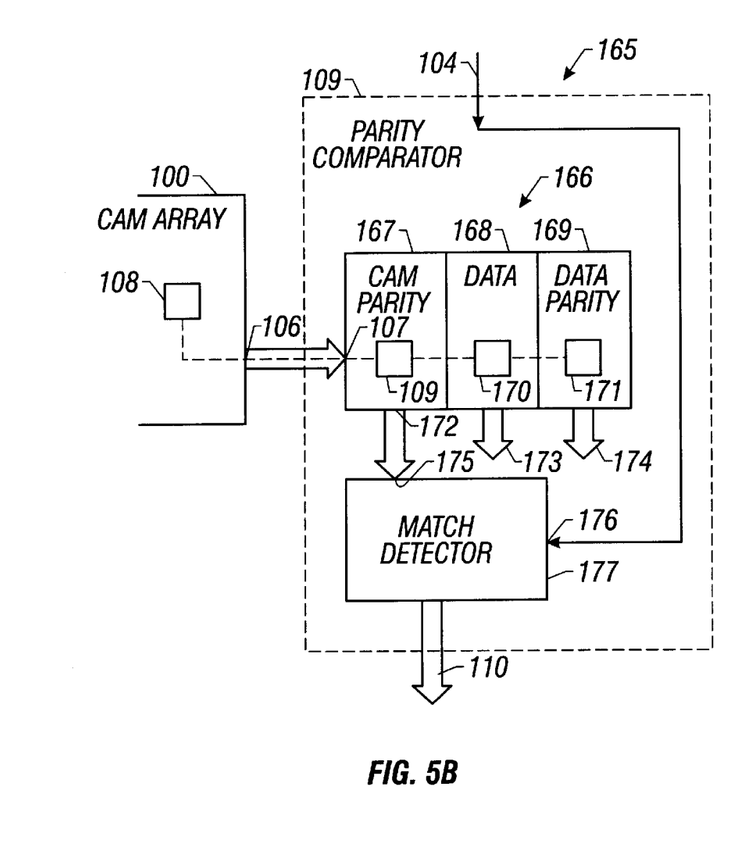
FIG. 5B illustrates a second specific embodiment for the parity comparator of the system of FIG. 4A.

FIG. 5B illustrates an alternate embodiment 165 for the parity comparator 105 of FIG. 4A. The output lines 106 of the CAM array 100 are connected to control lines 107 for a second memory array 166. The second memory array 166 contains separate memory locations for original tag parity, data, and original data parity, 167, 168, 169 associated with each memory location of the CAM array 100. The parity CAM parity array 167 is a readable memory. The control lines 107 are address lines and/or write control lines that enable tag parity memory cells of the CAM parity array 166 to write their contents to associated input terminals 175 of a match detector 177. In some embodiments, the control lines 107 also enable output lines 173, 174 from the data and data parity memory arrays 168, 169 to write data stored therein.

In FIG. 5B, the second memory 166 writes data stored therein to other structures. Specific embodiments of the second memory array 156 may comprise SRAM or DRAM. Each memory location 109, 170, 171 of the second memory array 166 is associated with the memory location 108 of the CAM array 100. In some embodiments, the CAM array 100 is the tag look-up file or the address directory of a cache memory, and the data array 170 is the cache memory itself. In alternate embodiments, the second memory 166 may only contain memory locations for storing the original tag parity of tag words stored in the CAM array 100 (not shown).

The output lines 172 from the CAM parity array 167 of FIG. 5B and the output line 104, of the parity encoder 103 of FIG. 4A, connect to first and second input terminals 175, 176, respectively, of the match detector 177. The output line 110 of the match detector 177, sends a "hit" signal in response to the signals at the first and second input lines 175, 176 being equal. Otherwise the output of the match detector 177 is logic 0. One construction for such an embodiment connects the input lines 175, 176 to the two inputs of an exclusive NOR gate and connects an output of the exclusive NOR gate to the output line 110. The output of match detector 177 indicates whether a match of a tag word to the input signal should be invalidated.

Figure 6B:
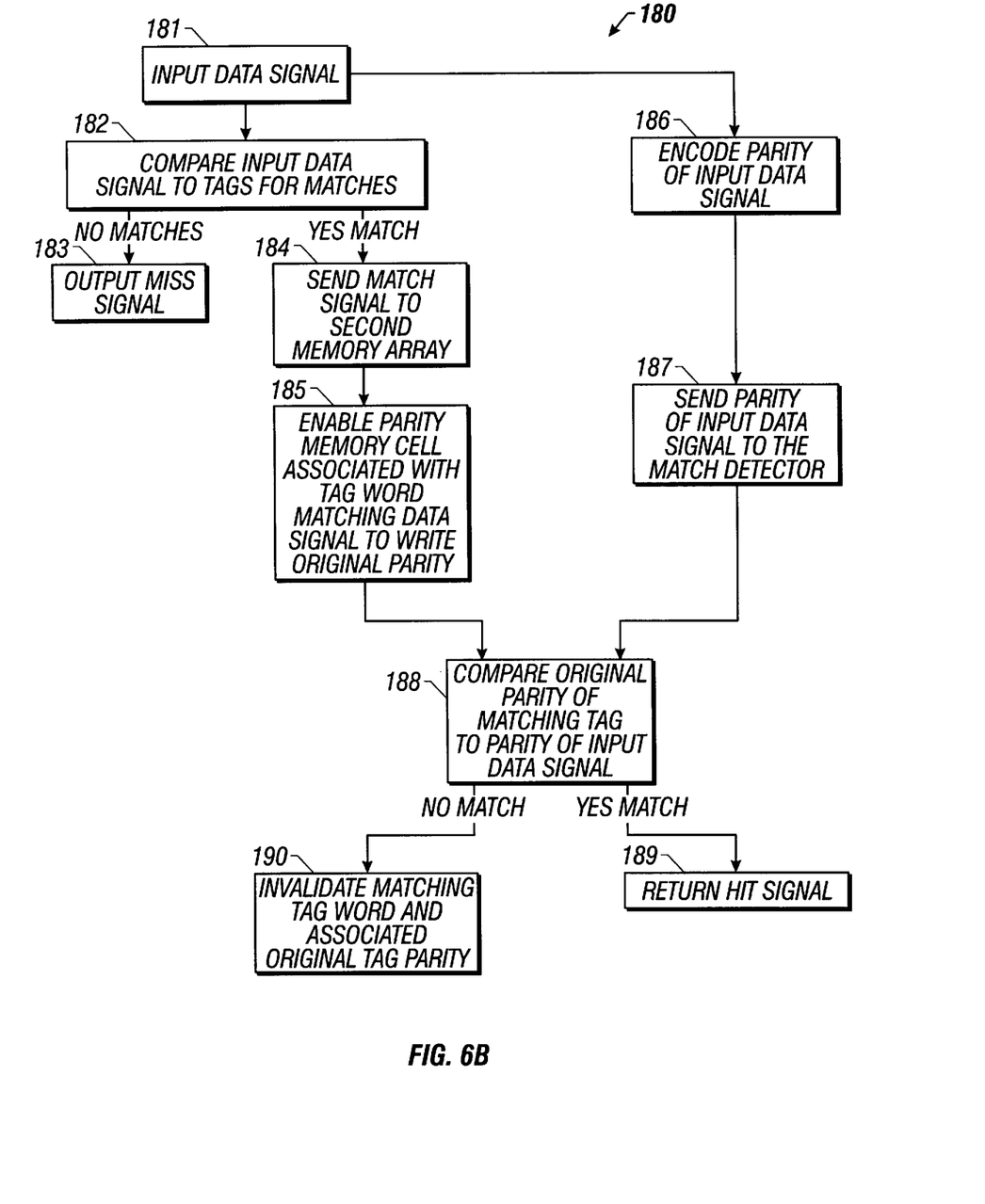
FIG. 6B is a flowchart illustrating the steps of a second specific embodiment for detecting soft errors with the embodiment of FIGS. 4A and 5B.

FIG. 6B is a flowchart illustrating the steps of an embodiment 180 for detecting errors, typically soft errors, with the embodiment 99 of FIG. 4A and the parity comparator 165 of FIG. 5B. At block 181, a data signal is received at the input source 101. At block 182, the input data signal is sent to the input lines 102 of the CAM array 100 and compared to the tag words therein for matches. At block 183, a "miss" signal is returned to an output of the CAM array 100 if no matches or associations occur between the input data signal and the tag words stored therein. At block 184, a match signal is sent to the associated memory locations of the second memory array 166, i.e. the data, original data parity and CAM parity memory arrays 168, 169, 167, in response to a first tag word of the CAM array 100 matching the input signal. At block 185, a first parity memory cell is enabled to write the original parity of the first tag word to the first input terminals 175 of the match detector 177 in response to receiving the match signal from the associated tag memory location that stores the first tag word in the CAM array 100. At block 186, the parity of the input signal is encoded. At block 187, the parity of the input signal is sent from the parity encoder 103 to the second input terminal 176 of the match detector 177. At block 188, the signals at the first and second input terminals 175, 176 of the comparator 172 are compared. At block 189, the comparator returns a "hit" signal if both the comparison of step 188 reveals a match and a tag word matched the input signal. At block 190, the match detector 177 returns a signal to invalidate the tag word stored in the CAM memory location reporting a match in block 182 if the comparison at block 188 did not reveal a match.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

What is claimed is:

1. An error detection circuit, comprising:
   a parity encoder having a first input terminal to receive an input data signal and a first output terminal to deliver a signal representative of the parity of the input data signal;
   a parity comparator having a second input terminal, having a third input terminal connected to the first output terminal, and having a plurality of memory cells to store original parities of tag words, the parity comparator for comparing a first original parity of a first tag word to the parity of the input data signal in response to receiving a first match signal; and
   a content addressable memory array having a fourth input terminal to receive the input data signal, and a second output terminal to send the first match signal in response to at least one of the tag words matching the input data signal, the second output terminal connecting to the second input terminal;
   wherein said parity comparator is separate from said content addressable memory array.

2. The error detection circuit as set forth in claim 1, wherein the second input terminal is for receiving a match signal from the content addressable memory array, and the third input terminal is for receiving the signal representative of the parity of the input data signal.

3. The error detection circuit as set forth in claim 1, wherein said content addressable memory array is a directory of a cache memory.

4. The error detection circuit as set forth in claim 1, wherein the signal representative of the parity is in the form of an error correction code and the original parities are in the form of error correction codes.

5. The error detection circuit as set forth in claim 1, wherein the parity comparator produces a second match signal in response to a match between the parity of the input signal and the parity of the first tag word.

6. The error detection circuit as set forth in claim 5, wherein the parity comparator further comprises:
   a parity memory array having a fifth input terminal connected to the third input terminal, said parity memory array including the plurality of memory cells and for sending the second match signal to a third output terminal; and
   a match detector having at least sixth and seventh input terminals, said sixth input terminal being connected to the second output terminal and said seventh input terminal being connected to the third output terminal, the match detector for sending a hit signal in response to receiving the first and second match signals.

7. The error detection circuit as set forth in claim 6, wherein said match detector includes an AND gate, said gate having input terminals coupled to the sixth and seventh input terminals, and having an output terminal to deliver a hit signal and a miss signal.

8. The error detection circuit as set forth in claim 6, wherein said parity memory array is for storing original parity information enabling error correction of said tag words.

9. The error detection circuit as set forth in claim 1, wherein said parity comparator comprises:
   a second memory array containing the plurality of parity memory cells and a third output terminal, said second output terminal being connected to an address input terminal of the second memory array that enables a first parity memory cell connected to the third output terminal; and
   a match detector having at least fifth and sixth input terminals and being adapted to comparing signals on said fifth and sixth input terminals for matches, the fifth input terminal being connected to the third input terminal and the sixth input terminal being connected to the third output terminal of the second memory array.

10. The error detection circuit as set forth in claim 9, wherein said second memory array is a readable memory.

11. The error detection circuit as set forth in claim 9, wherein said second memory array further comprises memory locations for storing data and data parity words associated with each tag word in said content addressable memory array.

12. The error detection circuit as set forth in claim 9, the match detector includes an exclusive NOR gate, a first input of the gate being connected to the sixth input terminal and a second input of the gate being connected to the fifth input terminal.

13. The error detection circuit of claim 9, wherein said parity array has a plurality of parity bits in each parity memory cell adapted to error correction of the associated tag words.

14. The error detection circuit as set forth in claim 9, wherein said content addressable memory array is a directory of a cache memory.

15. An apparatus, comprising:
   a first content addressable memory array having a first input and a first output to and from a first plurality of tag memory locations;
   a second content addressable memory array having a second input and a second output to and from a second plurality of tag memory locations; and
   a match detector having a third input connected to said first output, having a fourth input connected to said second output, said match detector to produce a hit signal in response to a first match signal on said third input matching a second match signal on said fourth input;
   wherein the first match signal indicates a match between an input signal on the first input and a content of at least one of the first plurality of tag memory locations, and the second match signal indicates match between the input signal on the second input and a content of at least one of the second plurality of tag memory locations.

16. A method for detecting errors in a content addressable memory array, comprising:
   comparing an input data signal and to at least one tag word stored in the content addressable memory array for a match;
   sending an output signal from the content addressable memory array to a parity comparator which is separate from the content addressable memory array in response to finding a match with a first tag word;
   producing a parity signal from the input data signal;
   enabling an output from a parity comparator, said output associated with the first tag word in response to receiving the output signal; and
   comparing an original parity for said first tag word with said parity signal for a match in response to receiving said parity signal in said parity comparator.

17. The method as set forth in claim 16, wherein the step of enabling produces a signal for a hit in response to finding a match in said step of comparing.

18. The method as set forth in claim 17, wherein the step of enabling produces a signal to invalidate said first tag word in response to not finding a match in said step of comparing.

19. The method as set forth in claim 16, further comprising:
- a second step of comparing original parities for substantially all tag words in the content addressable memory to said parity signal for matches; and
- a second step of sending signals for matches from said second step of comparing from a parity memory array to input terminals of a match detector; and
- wherein said step of enabling enabled an output terminal of said match detector.

20. The method as set forth in claim 19, wherein the step of enabling the output terminal of said match detector produces a signal to invalidate said first tag word in response to not finding a match in said first step of comparing.

21. The method as set forth in claim 19, wherein the step of enabling the output terminal of the match detector produces a signal for a hit in response to finding a match in said first step of comparing.

22. The method as set forth in claim 21, wherein said step of returning a signal for a hit produces an output signal for the address of the tag word matching the input data signal in response to said step of comparing producing a match.

23. The method as set forth in claim 19, wherein said step of enabling and said second step of sending includes sending at least one pair of first and second signals from an associated pair consisting of the tag location and the parity memory cell from the content addressable and the parity memory arrays to the inputs of an exclusive NOR gate.

24. A method for detecting errors in a content addressable memory array, comprising:
- comparing tag words in the content addressable memory for matches with an input data signal;
- sending an output signal from a first memory location of the content addressable memory array to a parity memory array in response a first tag word in the first memory location matching the input data word;
- enabling a first parity memory cell associated with the first memory location in response to receiving the output signal, the first parity memory cell to store the original parity of the first tag word; and
- comparing said original parity to a signal for the parity of the input data signal for a match.

25. The method as set forth in claim 24, wherein:
- the step of comparing includes sending the parity signal to substantially all data inputs of said parity memory array; and
- the step of sending an output signal includes sending the output signal to the address inputs of the parity memory array.

26. The method as set forth in claim 24, wherein
- said step of enabling further includes the step of writing a signal for the original parity stored in the first parity memory array to a match detector;
- said step of comparing includes comparing the parity of the input data signal to the signal from the step of writing.

27. The method as set forth in claim 24, wherein the step of comparing includes producing a signal for a hit in response to said original parity matching the parity of the input data signal.

28. The method as set forth in claim 27, wherein the step of comparing includes invalidating the tag word in response to the original parity not matching the parity of the input data signal.

* * * * *